United States Patent
Kobayashi et al.

(10) Patent No.: US 7,388,660 B2
(45) Date of Patent: Jun. 17, 2008

(54) LIGHT AMOUNT MEASUREMENT DEVICE AND LIGHT AMOUNT MEASUREMENT METHOD

(75) Inventors: Noboru Kobayashi, Kanagawa (JP); Riki Ogawa, Kanagawa (JP); Masayuki Hideshima, Tokyo (JP); Hiroyuki Nagahama, Tokyo (JP); Koji Nakajima, Tokyo (JP)

(73) Assignees: Advanced Mask Inspection Technology Inc., Kawasaki (JP); Kabushiki Kaisha Topcon, Tokyo (JP)

( * ) Notice: Subject to any disclaimer, the term of this patent is extended or adjusted under 35 U.S.C. 154(b) by 312 days.

(21) Appl. No.: 11/344,205

(22) Filed: Feb. 1, 2006

(65) Prior Publication Data
US 2007/0081149 A1 Apr. 12, 2007

(30) Foreign Application Priority Data
Oct. 12, 2005 (JP) ............................. 2005-297242

(51) Int. Cl.
*G01J 1/00* (2006.01)

(52) U.S. Cl. .................... 356/243.8; 356/222; 356/229
(58) Field of Classification Search .. 356/243.1–243.8, 356/213–229
See application file for complete search history.

(56) References Cited

U.S. PATENT DOCUMENTS
3,807,877 A * 4/1974 Yee ............................. 356/434
4,832,490 A * 5/1989 Boos et al. ................. 356/325
7,116,417 B2 * 10/2006 Imura ......................... 356/326

FOREIGN PATENT DOCUMENTS
JP 4-262243 9/1992

* cited by examiner

*Primary Examiner*—Hoa Q Pham
(74) *Attorney, Agent, or Firm*—Oblon, Spivak, McClelland, Maier & Neustadt, P.C.

(57) ABSTRACT

A device for measuring the intensity of incoming light is disclosed. This device includes a rotatable light blocking unit which interrupts incident signal light at short regular intervals. The device also includes a light source which emits certain light different from the signal light while the signal light is interrupted by the block unit, and a measurement unit for measuring intensity values of the signal light and the certain light. A correction unit is provided for correcting the measured signal light intensity based on the certain light intensity. A calculator unit calculates a correction value through comparison of the intensity of the certain light to a reference value. The correction unit uses this correction value to correct the signal light intensity.

10 Claims, 9 Drawing Sheets

LIGHT AMOUNT MEASUREMENT DEVICE AND LIGHT AMOUNT MEASUREMENT METHOD

CROSS-REFERENCE TO RELATED APPLICATION

This application is based upon and claims the benefit of priority from prior Japanese Patent Application No. 2005-297242, filed on Oct. 12, 2005, the entire contents of which are incorporated herein by reference.

BACKGROUND OF THE INVENTION

1. Field of the Invention

The present invention relates generally to a method and apparatus for measuring the luminous intensity of incident light and, more particularly, to a technique for correcting the light intensity as measured by a light amount measurement device using a light chopper plate, for example.

2. Related Art

For measurement of the intensity of an incoming beam of signal light, a photosensitive element serving as a photodetector is used to measure the intensity of signal light received thereby. Here, currently available photosensitive elements have relatively large temperature dependency and thus are faced with a problem as to deficiency of sensitivity stability. In particular, for high-sensitivity photodetective elements operable to measure an extra-low intensity of light, this instability problem occurs severely and is not negligible.

A prior known approach to avoiding this problem is to split or "diverge" a portion of signal light by a beam sampler for causing a diverged light component to be coupled with an optical fiber. Then, attenuate the diverged light to a level equivalent to that of the signal light containing therein optical measurement information, which light is then introduced into a photoelectron multiplier tube. Next, a pendulum-like swingable rotation shutter is used to selectively block or "shield" the diverged light and the signal light, causing the diverged light and signal light to enter the same photoelectron multiplier tube in a time-series manner. Prior art light intensity measuring equipment employs such optical configuration to perform measurement of the signal light intensity while at the same time correcting a measured signal light amount variation by letting the light-path interruption operations of the diverged light and signal light be synchronized with each other. A device using this technique is disclosed, for example, in JP-A-4-262243, which is designed to perform the measured light amount variation correction, also including sensitivity drift correction or else of a photoelectron multiplier tube for use as a photosensitive element, to thereby improve the optical measurement accuracy.

Unfortunately, the prior art configuration does not come without accompanying a penalty as to increased complexity of an optical system which produces the diverged light acting as reference light used for execution of the measured light amount variation correction, including but not limited to a structure for partially diverging the signal light by a beam sampler or a structure for selectively interrupting the signal light and the light which is diverged by a pendulum-like swingable rotation shutter. Another problem faced with the prior art is that luminous intensity measurement of the reference light has no more than an ability to control the distance between optical fiber end faces for coupling the diverged light, resulting in the lack of either the light intensity adjustment setup accuracy or the degree of freedom.

As apparent from the foregoing, prior art light amount measurement devices suffer from the optical-system complexity problem and are under strict requirements for performing control of the pendulum-like swingable rotation shutter. Furthermore, due to the fact that the light obtained by divergence of part of the signal light is used as the reference light for correction of variations in measured intensity of the signal light, the prior art lacks the light amount adjustment setup accuracy and/or the degree of freedom—in particular, it suffers from limits in correctable contents, such as an inability to correct the linearity of a photosensitive element for use as the photodetector.

BRIEF SUMMARY OF THE INVENTION

It is an object of this invention to avoid the problems faced with the prior art to thereby provide a technique for correcting the sensitivity drift or the linearity of a photosensitive element(s) while reducing the complexity of an optical system.

In accordance with one aspect of the invention, a light amount measurement device is provided, which includes a rotatable light blocking unit responsive to receipt of incident signal light for interrupting the signal light at predefined time intervals while being driven to rotate. The device also includes a light source for emitting certain light that is different from the signal light within a time period during which the signal light is interrupted by the blocking unit. The device further includes a measurement unit which receives the signal light and the certain light and measures a luminous intensity of the signal light and an intensity of the certain light, a correction unit for correcting the intensity of the signal light based on the intensity of the certain light, and a calculator unit for calculating a correction value through comparison of a reference value and the intensity of the certain light. The correction unit uses this correction value to correct the signal light intensity.

In accordance with another aspect of the invention, a light amount measurement method includes measuring a luminous intensity of incident signal light with a predetermined period, measuring, within a time period during which the signal light is absent, an intensity of certain light as emitted from a light source different from a light source of the signal light, and using the intensity of the certain light to correcting the intensity of the signal light.

In accordance with another aspect of the invention, a light amount measurement method includes interrupting incident signal light at prespecified time intervals, receiving the signal light for measurement of an intensity of the signal light, causing a light source different from that of said signal light to emit certain light within a time period during which said signal light is interrupted, receiving said certain light for measurement of an intensity thereof, calculating a correction value through comparison of the intensity of said certain light to a reference value, and using the correction value to correct the intensity of said signal light.

DETAILED DESCRIPTION OF THE INVENTION

Figure 1:
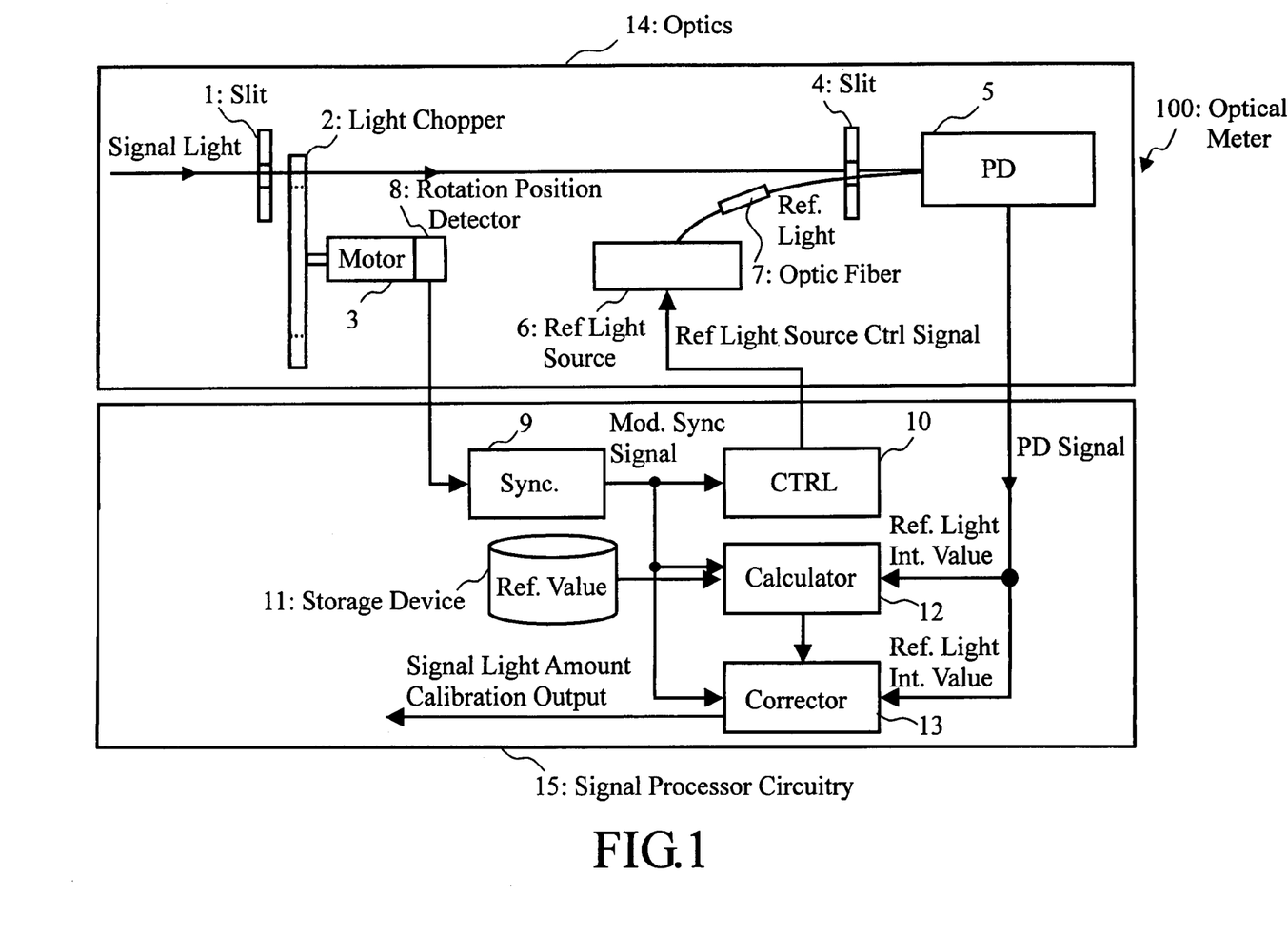
FIG. 1 is a diagram showing an overall configuration of a luminous intensity measurement device in accordance with one embodiment of this invention.

Referring to FIG. 1, there is shown a configuration of a luminous intensity measurement device 100 embodying the invention. As shown herein, the measurement device 100 includes an optical system 14 and a signal processing circuit unit 15. The optics 14 is generally made up of a slit member 1, a light chopper plate 2 which is an example of the blocking unit as claimed, an electric motor 3, a slit member 4, a photosensitive element 5 functioning as a photodetector which exemplifies the measurement unit claimed, a reference light source 6, an optical fiber cable 7, and a rotation position detector 8. The signal processor circuitry 15 includes a synchronizer circuit 9, a reference light source control circuit 10, a storage device 11 storing therein a reference value, a correction value calculation circuit 12, and an arithmetic circuit 13 for execution of correction processing.

An incoming beam of signal light is narrowed by the spilt 1. The resulting narrowed signal light is modulated by the light chopper plate 2. Such modulation by the light chopper 2 makes it possible to remove noises. The signal light thus modulated is again narrowed by the slit 4, and then guided to fall onto the photodetector 5. Upon receipt of the narrowed beam of signal light, photodetector 5 measures the luminous intensity or light amount of the signal light received. This photodetector 5 also receives a beam of reference light, which is different from the signal light and is sent from the reference light source 6 by optical fiber 7 through slit 4. When receiving the reference light that is narrowed by slit 4, photodetector 5 measures the intensity of such reference light received. The reference light source 6 is driven and controlled by the reference light source control circuit 10 in such a way as to give off the reference light, which blinks with a prespecified period and a number of times and has a predetermined amplitude or a variable amplitude having a ramp-like waveform.

Figure 2:
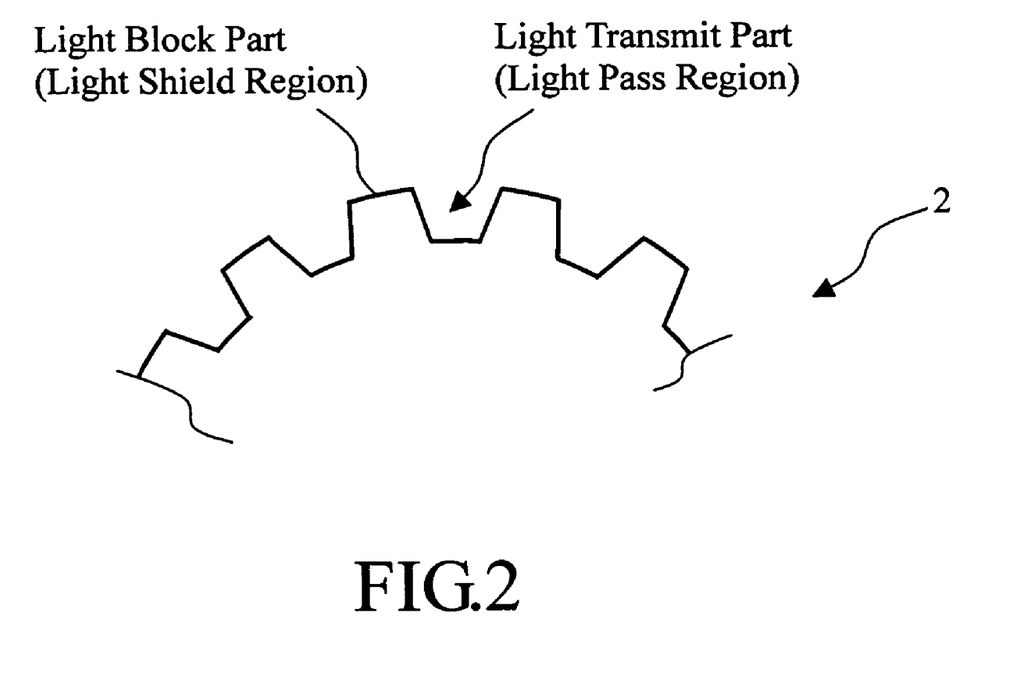
FIG. 2 depicts part of a light chopper plate used in the measurement device of FIG. 1.

FIG. 2 shows a partial view of the light chopper plate 2. As shown herein, the light chopper 2 is arranged to have a shape which resembles a toothed wheel or "gear." The light chopper 2 is driven by the motor 3 to rotate at a regulated speed. Light chopper 2 functions to rotate and intermittently interrupt the incident signal light at predefined time intervals. More specifically, when the signal light hits a light block portion or "tooth" of the chopper 2, the light is blocked or "shielded." When being incident to a light transmission portion—i.e., a gap space between adjacent teeth—of chopper 2, the light passes through it. Such intermittent interruption (light shielding) of the signal light at specified intervals enables reduction or removal of noises. The signal light block (shield) also makes it possible to perform arithmetic computation or calculation of a correction value by means of the reference light in a way as will be described later.

The rotation position detector 8 is operatively associated with the motor 3 for detecting a rotation position of the light chopper plate 2. Detecting the chopper 2's rotation position makes it possible to detect, with high resolution, the modulation timings of penetration and blocking of the signal light in accordance with the rotation position of light chopper 2.

In the signal processor circuitry 15, the synchronizer circuit 9 is responsive to receipt of a detection signal as output from the rotation position detector 8, for generating a modulation synchronization signal which is synchronous with the modulation timings of the light chopper plate 2. The reference light source controller 10 is rendered operative with such modulation sync signal as a trigger signal to drive and control the reference light source 6 so that it emits the reference light within a light shield time period of the signal light. The reference light source 6 is provided independently of that of the signal light to be received by a single photosensitive element 5 and is driven and controlled within the light shield period whereby it becomes possible to provide a wide variety of kinds of controls, including but not limited to the intensity of the reference light and a length of irradiation time.

The storage device 11 may typically be a magnetic disk drive unit, which prestores therein a reference value to be used for comparison during any one of sensitivity correction and linearity correction of the photodetector 5. This reference value is used through measurement of an intensity value of the signal light. Upon startup of a measurement session, the intensity of the reference light is measured to specify an intensity value, which is for use as the reference value.

The correction value calculator circuit 12 is responsive to receipt of the modulation sync signal, for determining the signal light shield time period, i.e., a period for acceptance of the reference light. The calculator 12 also inputs from the photodetector 5 a photodetection signal indicative of a measured intensity value of the reference light as received by photodetector 5 within the reference light receive period, for comparing it to the reference value to thereby calculate a correction value.

The correction processor circuit 13 is triggered by the modulation sync signal to determine the signal light receive time period and also correct or "amend," based on the correction value as calculated by the correction value calculator circuit 12, the measured intensity value of the signal light which was received by the photodetector 5 within the signal light receipt period to thereby enable calibration of the signal light intensity.

Figure 3:
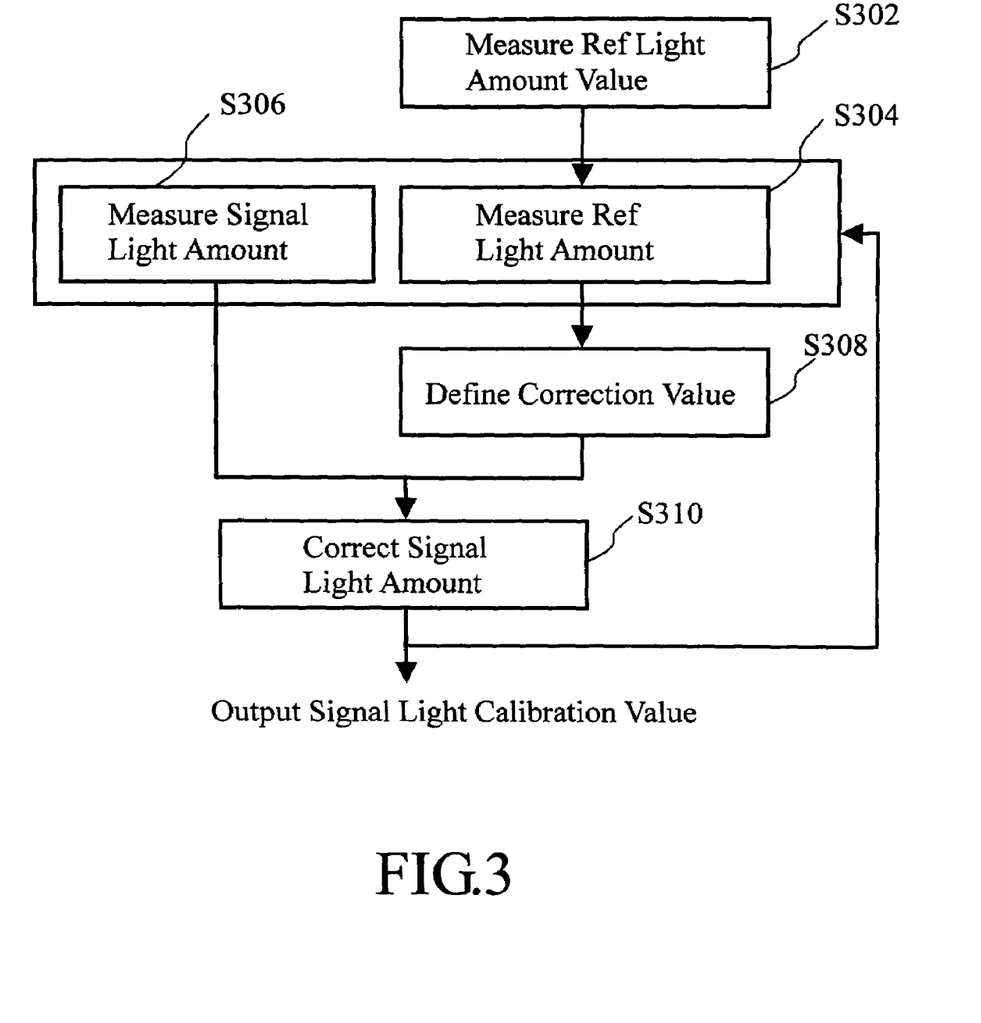
FIG. 3 is a flow diagram of main process steps during operation of the measurement device embodying the invention.

See FIG. 3, which shows in flowchart form some major process steps during operation of the intensity measurement device 100 in accordance with the embodiment of the invention.

At step S302 for measurement of a reference light intensity value, the photodetector 5 measures a luminous intensity of the reference light, which is then stored as the reference value in the storage device 11.

At step S304, a reference light intensity is measured. More specifically, measure a luminous intensity value of the reference light as given off from the reference light source 6 within a time period during which the signal light is interrupted by the light chopper plate 2.

At step S306, a signal light intensity is measured. More specifically, measure an intensity value of the signal light which passed through the light chopper plate 2 within a light penetration period.

Figure 4:
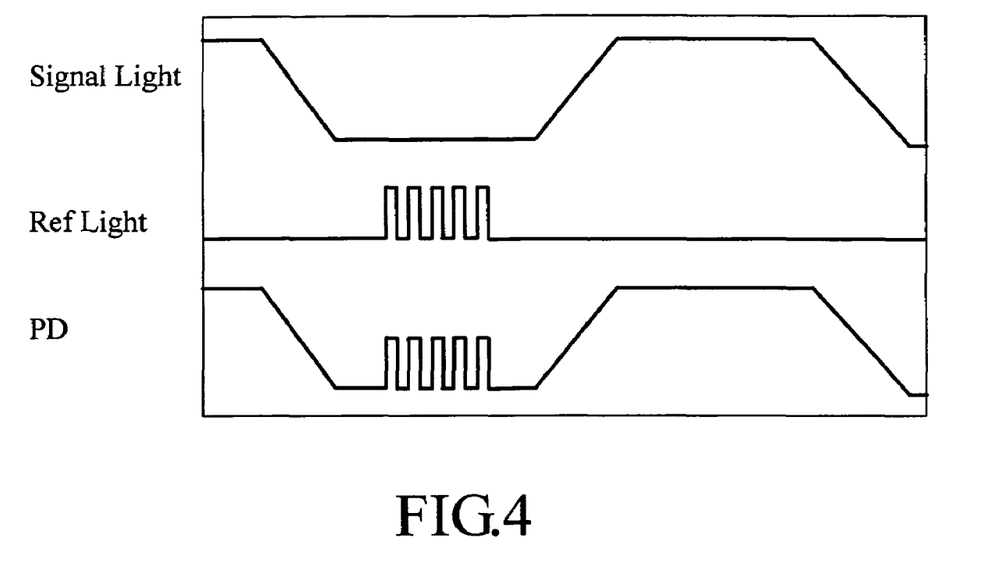
FIG. 4 is a waveform diagram showing the relation in timing of signal light and reference light plus a light intensity value as measured by a photosensitive element.

See FIG. 4, which shows typical waveforms of the "chopped" signal light and the reference light in relation to the photodetector-measured intensity value.

As shown in FIG. 4, one of the light shield portions or "gear teeth" of the light chopper plate 2 gradually blocks the signal light having its beam diameter substantially equal to the diameter of the slit 1. When the signal light completely enters a light shield period, the reference light is given off as a pulse wave with a specified amplitude. In such case, the photodetector 5 measures an intensity of the signal light within the pass-through period of the signal light; within the light shield period of the signal light, photodetector 5 measures an intensity of the reference light which is blinking at certain time intervals and has a pulse waveform as shown in FIG. 4. In other words, photodetector 5 is operable to measure the intensity of only either one of the signal light and the reference light at a time.

At step S308 of FIG. 3, correction value calculation is done. Specifically, the correction value calculator circuit 12 receives at its input the intensity value of the reference light as measured within a reference light receive period and then calculates a correction value by comparison to the reference value.

At step S310 for correction of the signal light intensity, the correction processor circuit 13 receives both the signal light intensity value and the correction value and corrects the signal light intensity value based on the correction value as input to processor 13, thereby performing calibration of the signal light intensity.

Figure 5:
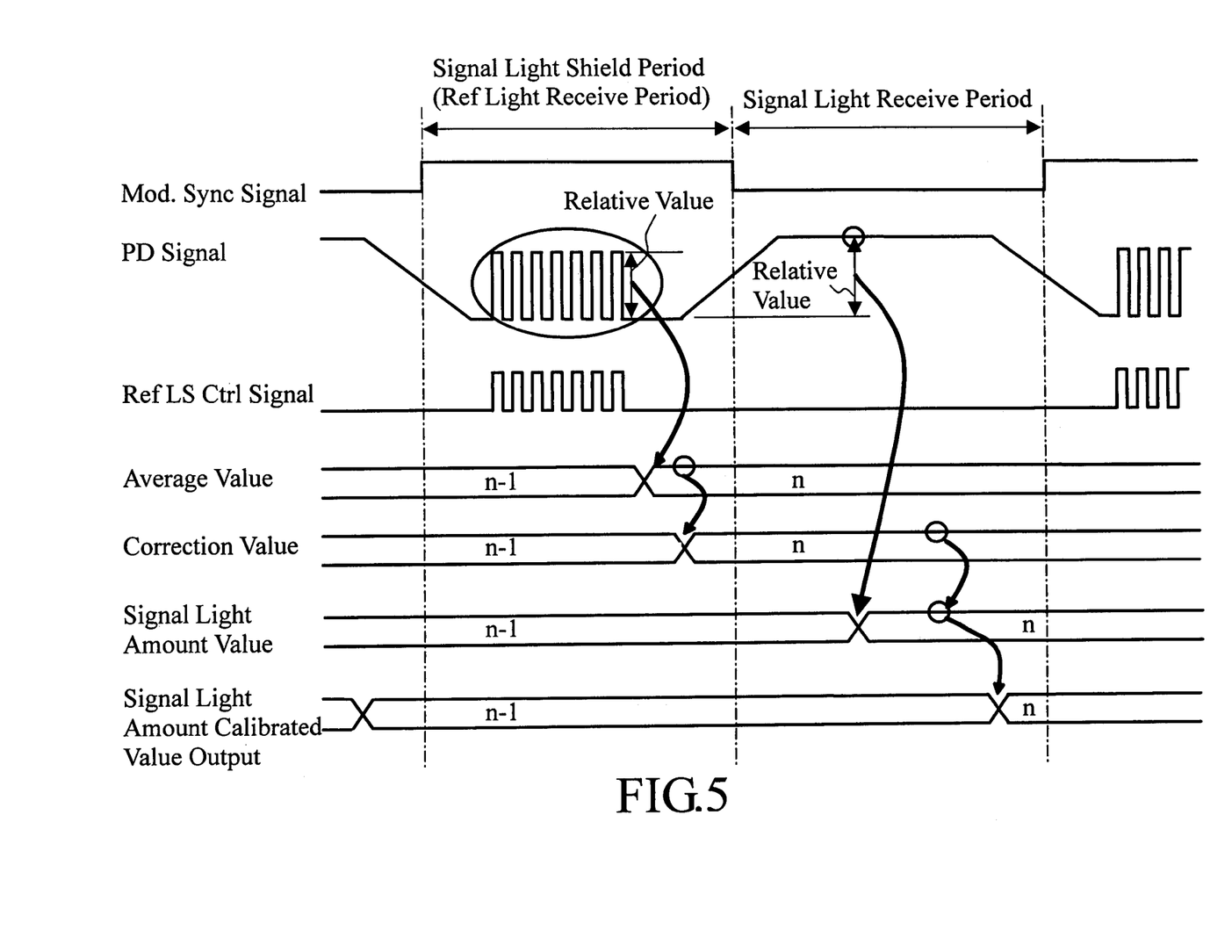
FIG. 5 is an operation timing chart of some major signals available during execution of sensitivity correction of the photosensitive element.

FIG. 5 is an operation timing chart showing the waveforms of some major signals generated during sensitivity correction of the photodetector 5.

Shown in FIG. 5 are an output signal of the photodetector 5 and an operation of the signal processor circuitry 15 when causing the reference light to blink with a specified intensity value and an irradiation time and a number of times for irradiation.

From the modulation sync signal of the synchronizer circuit 9, the signal light shield period (reference light receive period) and the signal light receive period are recognizable. Within the signal light shield period, the reference light source control signal of the reference light source controller 10 is used to drive and control the reference light source 6 so that the reference light performs a blinking operation to thereby emit a pulse wave with a specified amplitude. The correction value calculator circuit 12 calculates an average value n of intensity values by dividing by a pulse wave number a total sum of differences (relative values) between maximal and minimal values of the intensity value which becomes the amplitude of each pulse wave resulting from readout of this photodetection signal of the photodetector 5 at each blink time. In FIG. 5, such calculation of the average value n is done after completion of the pulse wave of the reference light, so a time lag takes place until data is switched from the (n−1)th average value n−1 to the n-th average value n in the timing chart. The correction value calculator circuit 12 compares the average value n to the reference value being presently stored in the storage device 11 to thereby calculate a correction value n. In this event also, the arithmetic correction value n is calculated after having computed the average value n, so a time lag occurs while data is switched from the (n−1)th average value n−1 to the n-th correction value n in the timing chart. By forcing the reference light to blink for irradiation of a pulse wave with the specified amplitude, it is possible to reduce noises during averaging of the intensity value, when compared to cases where light with a constant intensity value is continuously given off.

Next, the correction processor circuit 13 applies, based on the correction value n, sensitivity correction to the n-th signal light intensity value n resulting from readout of the photodetection signal as output from the photodetector 5 within a signal light receive period that is equivalent to the timing after the signal light shield period, thereby generating at its output a signal light intensity calibration value n. More specifically, the signal light also is designed to use a value which is averaged by reading in a specified cycle a difference (relative value) between the value of the photodetector 5 during light shielding and the intensity value of the signal light. Owing to the reading of the photodetection signal at a time point within the signal light receive period, the data is switched from the (n−1)th signal light intensity value n−1 to the n-th signal light intensity value n in the timing chart. At an instant whereat the sensitivity correction is applied based on the correction value n to the signal light intensity value n to which the data was switched from the signal light intensity value n−1, the data is switched from the (n−1)th signal light intensity calibration value n−1 to the n-th signal light intensity calibration value n in the timing chart.

The operation above is repeatedly performed once per alternate iteration of the signal light shield period and the signal light receive period whereby it is possible to accurately measure the intensity of the signal light while excluding temperature drifts of the photodetector 5.

Figure 6:
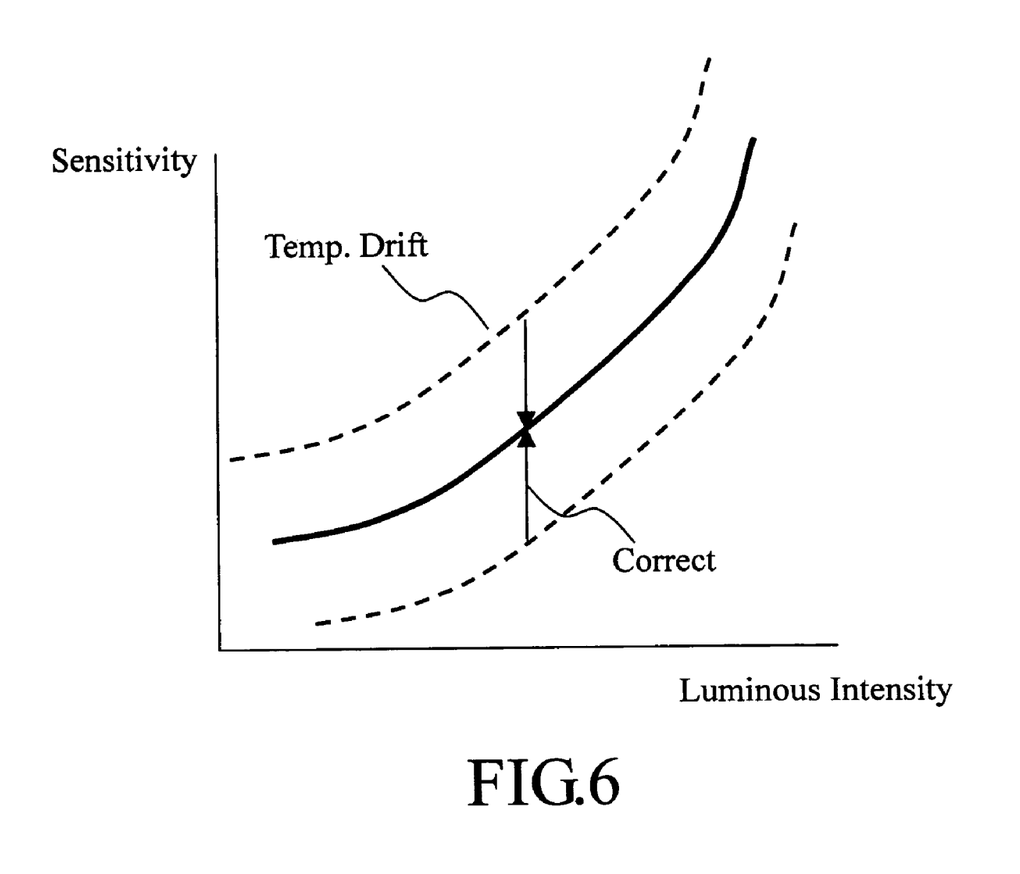
FIG. 6 is a graph showing a curve of the sensitivity versus the luminous intensity for explanation of temperature drift correction.

FIG. 6 is a graph showing a plot of the sensitivity versus the luminous intensity for explanation of the temperature drift correction.

As shown in FIG. 6, the sensitivity of photodetector 5 is defined relative to a light amount or intensity. However, due to a change in environment such as temperature or else, the sensitivity causes drift. By the correction in the illustrative embodiment, a value indicated by dotted line is corrected to the value for use as a reference, thereby making it possible to accurately measure the intensity of the signal light without regard to environmental temperatures.

Note here that this sensitivity correction should not exclusively be limited to the signal light which was received after a signal light shield time period. An example of other preferable approaches is that calibration is applied, using the above-noted correction value n of the signal light shield period, to an incident beam of signal light which is received prior to the signal light shield period. In short, the correction value may be usable to correct any one of the signal light prior to the light shield period and the signal light obtained thereafter.

In prior art designs using part of the signal light, the reference light is merely given off to have a constant intensity. In contrast, the embodiment is arranged to control the reference light to flash on and off or "blink" for example.

This makes it possible to obtain an accurate reference light intensity value while at the same time precluding or minimizing the noise influenceability.

Figure 7:
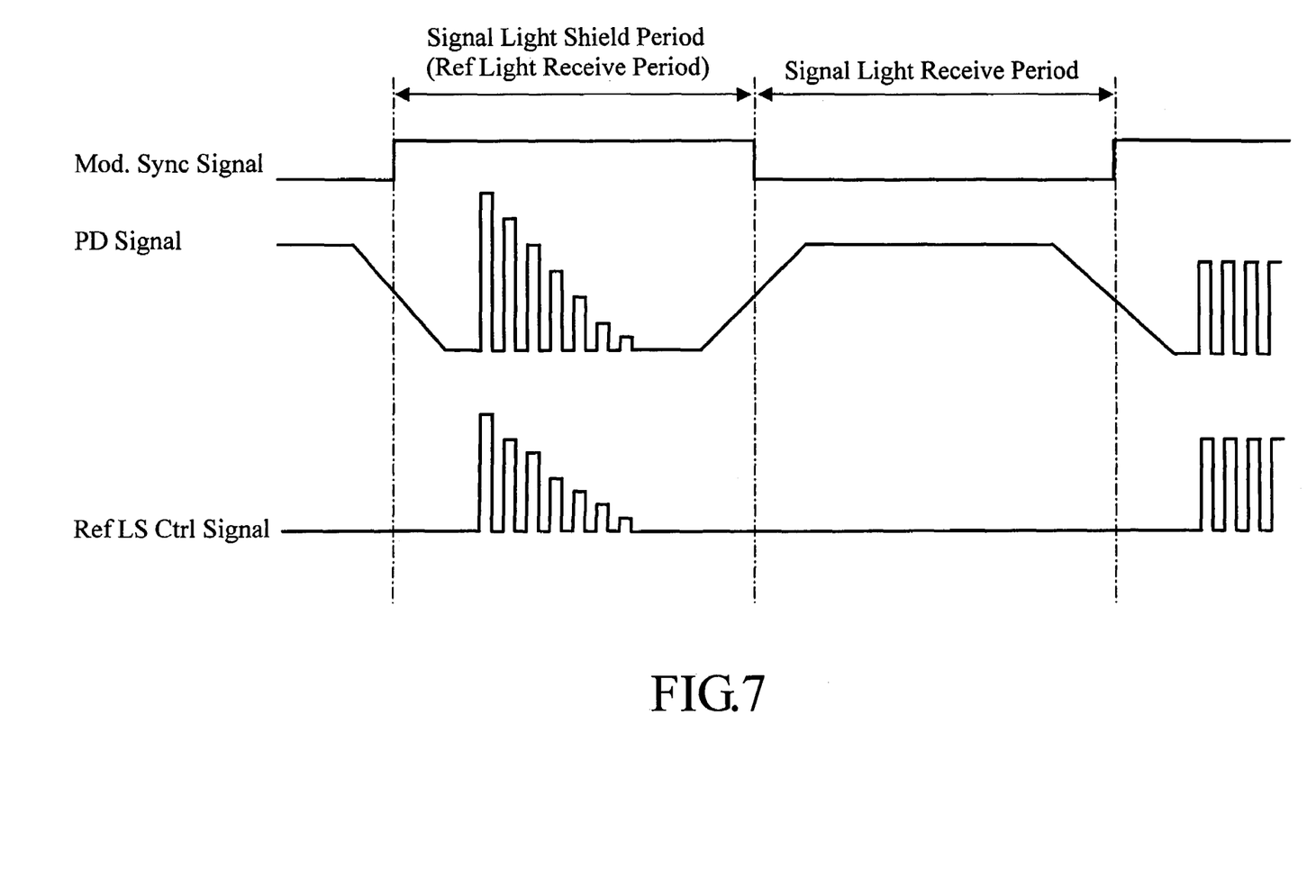
FIG. 7 is an operation timing chart of some signals as generated during linearity correction of the photosensitive element.

FIG. 7 is an operation timing chart of some major signals which are generated during linearity correction of the photodetector 5.

Shown in FIG. 7 are an output signal of the photodetector 5 and an operation of the signal processor circuitry 15 when letting the reference light blink with its intensity being swingable to a plurality of values and also with an irradiation time and a number of times for irradiation.

The photodetector 5 inherently has the dynamic range of a detectable light amount. In view of this, the intensity of the reference light is swung in conformity with such dynamic range of intensity detection to define an intensity value as measured by photodetector 5 at this time. Using this value makes it possible to calculate a linearity correction value of photodetector 5.

In this case also, the signal light shield period (reference light receive period) and the signal light receive period are recognizable from the modulation sync signal of the synchronizer circuit 9. Within the signal light shield period, the reference light source control signal of the reference light source controller 10 is used to drive and control the reference light source 6 so that the reference light performs a blinking operation to thereby emit a pulse wave with a plurality of amplitudes (intensities) in a way pursuant to the significance of the dynamic range of light amount detection. The correction value calculator circuit 12 reads thereinto a photodetection signal of the photodetector 5 at the intensity in each blink event and then calculates an average value at each intensity in such a way that the photodetection signal at each intensity becomes linear when being plotted in a graph—that is, the sensitivity is in linear proportion to the intensity. With such calculation of the correction value, it is possible to perform the linearity correction of photodetector 5. Next, the correction processor circuit 13 applies, based on the correction value corresponding to the signal light intensity value thus read, sensitivity correction to a photodetection signal as output from the photodetector 5 within a signal light receive period equivalent to the timing after the signal light shield period, thereby enabling output of a signal light intensity calibration value with its linearity being corrected.

Figure 8:
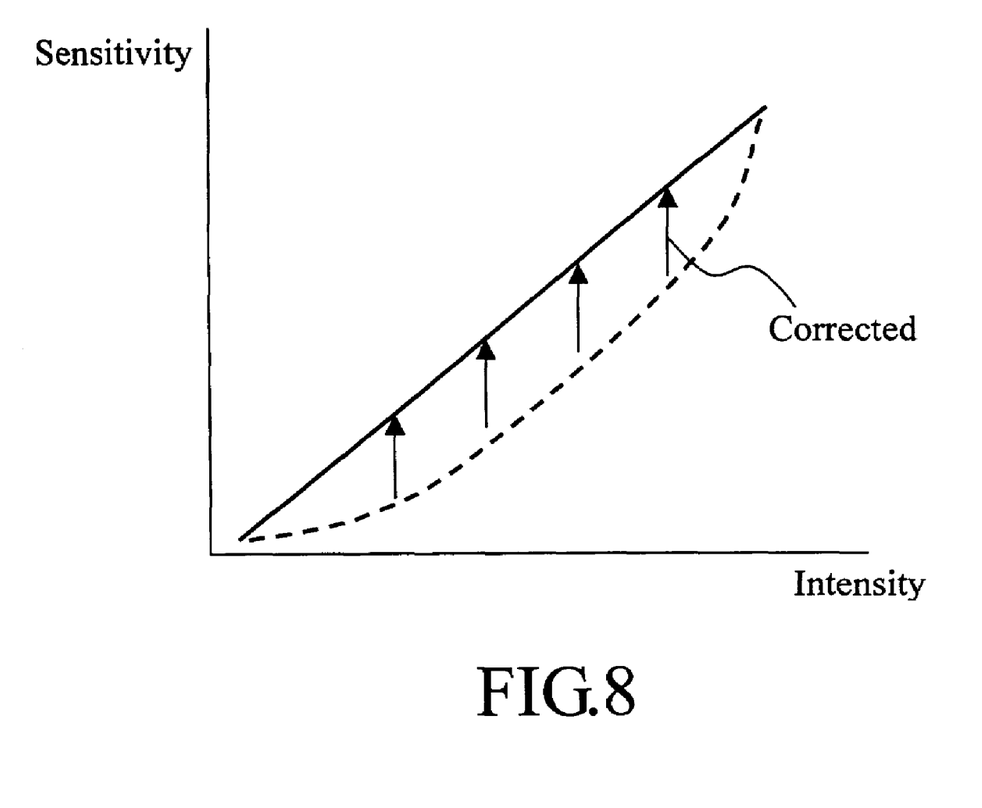
FIG. 8 is a graph showing a plot of the sensitivity versus the intensity for explanation of the linearity correction.

FIG. 8 is a diagram graphically showing the relation of the sensitivity versus the intensity for explanation of the linearity correction.

As shown in FIG. 8, the photodetector 5 is defined in sensitivity with respect to a certain light amount. However, its graph-plotted line becomes like a curve in some measure rather than a straight line segment. Owing to the correction by the illustrative embodiment, a string of linearity-inferior values indicated by dotted curve is corrected to the values on a straight line, thereby making it possible to perform the intended linearity correction.

FIG. 9 is a diagram for explanation of comparison with the prior art.

Figure 9A:
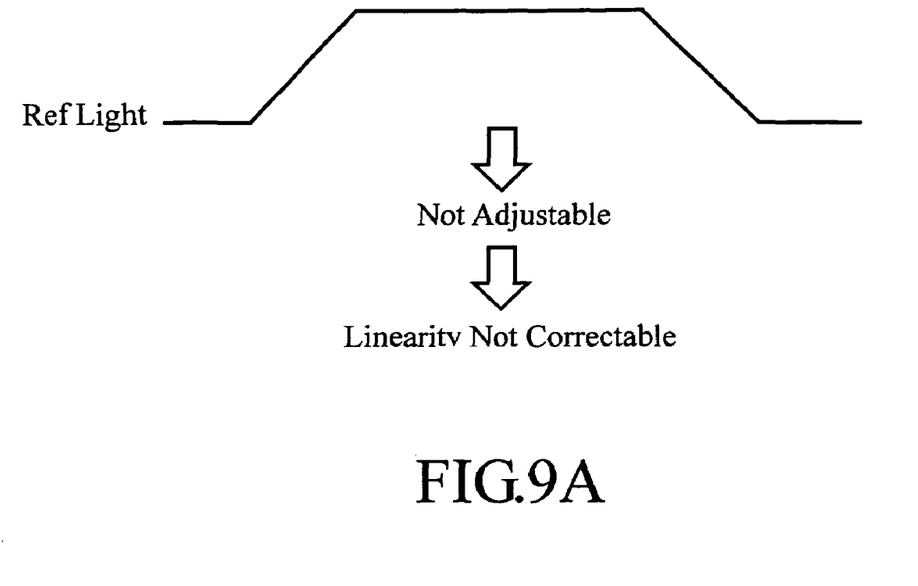
FIG. 9 shows a pulse-shaped waveform of reference light used in the embodiment device in comparison with that in the prior art.
Figure 9B:
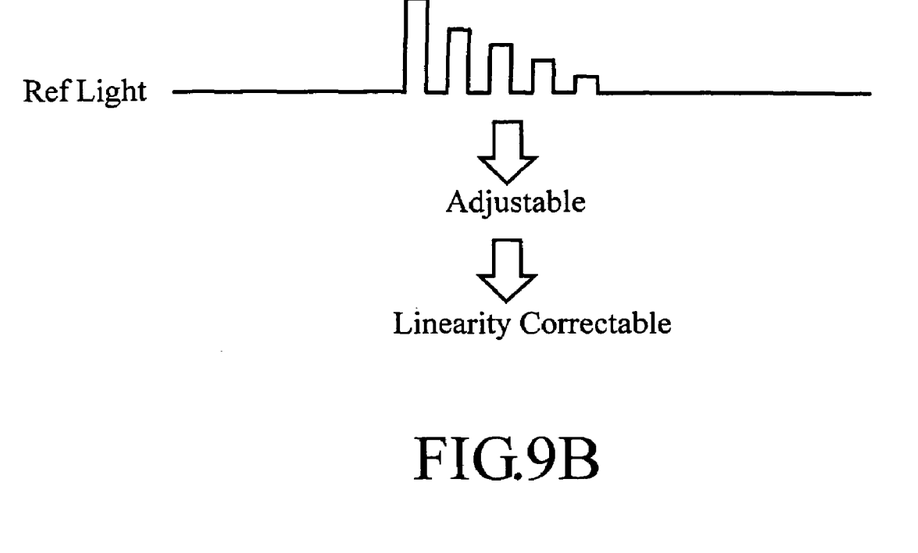

In prior known apparatus including a beam sampler for partially splitting an incident beam of signal light and a pendulum-like swingable rotation shutter for selectively interrupting or blocking the split light and the signal light, reference light used therein is merely emitted to have a constant intensity in accordance with an operation of the rotation shutter as shown in part "a" of FIG. 9. In contrast, the embodiment is arranged to use an independent light source and thus is capable of emitting a pulse wave with multiple amplitude levels (light amounts) as shown in part "b" of FIG. 9. Note here that in the case of the prior art with no more than the ability to irradiate a constant amount of light, it is hardly possible to emit any pulse wave with multiple amplitudes (light amounts) in conformity to the dynamic range for intensity detection of a photosensor used, which in turn makes it impossible to correct the linearity. On the contrary, the embodiment is capable of emitting a pulse wave with a freely settable amplitude(s), so it is possible to emit the pulse wave with multiple amplitudes (intensities) in a way pursuant to the dynamic range for intensity detection of the photosensor. Thus it is possible to correct the linearity of photosensor.

As apparent from the foregoing description, according to this embodiment, it becomes possible to achieve the sensitivity correction and the linearity correction of a stability-less photosensitive element(s) on a real time basis. This makes it possible to improve the measurement accuracy. Another advantage lies in the capability to utilize, with no substantive changes, currently established modulation techniques using a light chopper plate, which are typically employed for removal of disturbance light noises. In addition, by providing the reference light source separately in a way independent of a source of the signal light, it is possible to make the beam sampler and rotation shutter unnecessary, thus enabling the optics to decrease in complexity.

As previously stated, this embodiment is arranged to include the light source for emitting specified light different from the signal light and the rotatable block unit for interrupting the signal light at predetermined intervals while being driven to rotate at a spin rate. Thus it is possible to avoid the use of complicated optical systems, as in the prior art structure using the beam sampler for partly splitting the signal light and the structure for selectively blocking the signal light and the light as split by the pendulum-like swingable rotation shutter. In addition to such feature unique to the embodiment, it is possible by comprising the light source for emitting specified light different from the signal light to adjust the light amount in a way irrespective of the signal light, thereby enabling either the setup accuracy or the degree of freedom to improve accordingly. This makes it possible to perform luminous intensity correction with much enhanced accuracy. Thus it is possible to perform light amount measurement with higher accuracy than ever before.

System elements which are expressed by the terms "circuits" or "steps" in the description above may be arranged by computer-executable software programs. These may alternatively be implemented not only by software programs but also by use of hardware and software combinations. Similar results are also obtainable by designing them in combination with firmware. In the case of program-based configurations, the programs are prestored in nondestructive recording media, such as magnetic disks, magnetic tapes, floppy diskettes (FDs), read-only memories (ROMs) or equivalents thereto. In this case, interconnection with the optics 14 is establishable using a data transmission bus system via an appropriate interface (I/F) while providing connection to a digital computer(s). Such bus is associated with the storage device 11 as linked thereto.

While the invention has been described with reference to specific embodiments, the description is illustrative of the invention and is not to be construed as limiting the invention.

Additionally, although detailed explanations are omitted as to those components which are not directly required for the description of this invention, such as device configurations and control schemes or else, it is possible to selectively use any required device configurations and control schemes on a case-by-case basis.

It should be appreciated that for miscellaneous matters, any variants of the light amount measurement apparatus and methodology which have the essential elements of the invention and are design-changeable by ordinary skilled technicians are construed to be involved in the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A light amount measurement device comprising:
   a blocking unit responsive to receipt of incident signal light for rotating and interrupting the signal light at predefined time intervals;
   a light source operative to emit certain light different from the signal light within a time period during which the signal light is interrupted by said blocking unit;
   a measurement unit for receiving the signal light and the certain light and for measuring an intensity of the signal light and an intensity of the certain light;
   a correction unit for correcting the intensity of said signal light based on the intensity of said certain light; and
   a calculator unit for calculating a correction value through comparison of a reference value and the intensity of said certain light, wherein
   said correction unit corrects the intensity of said signal light based on said correction value.

2. The device according to claim 1, wherein said light source is driven and controlled to blink to thereby emit said certain light.

3. The device according to claim 2, wherein said light source is driven and controlled with a prespecified amplitude for a predefined number of times to thereby emit said certain light.

4. The device according to claim 2, wherein said light source is driven and controlled with a ramped amplitude for a predefined number of times to thereby emit said certain light.

5. The device according to claim 2, wherein said light source is driven and controlled with a predefined period for a predefined number of times to thereby emit said certain light.

6. The device according to claim 1, further comprising:
   a rotation position detector for detection of a rotation position of said blocking unit.

7. The device according to claim 6, further comprising:
   a synchronizer circuit for generating based on a detection signal of said rotation position detector a modulation synchronization signal as synchronized with a modulation timing of said blocking unit, wherein
   said light source is operable with the modulation synchronization signal as a trigger to emit said certain light.

8. The device according to claim 1, wherein said correction unit corrects based on said correction value any one of an intensity of said signal light as measured by said measurement unit prior to interruption by said blocking unit and an intensity of said signal light measured by said measurement unit after interruption by said blocking unit.

9. A light amount measuring method comprising:
   measuring an intensity of incident signal light with a predetermined period;
   measuring, within a time period during which the signal light is absent, an intensity of certain light as emitted from a light source different from a light source of said signal light; and
   correcting the intensity of said signal light based on the intensity of said certain light.

10. A light amount measurement method comprising:
    interrupting incident signal light at prespecified time intervals;
    receiving the signal light for measurement of an intensity of the signal light;
    causing a light source different from that of said signal light to emit certain light within a time period during which said signal light is interrupted;
    receiving said certain light for measurement of an intensity thereof;
    calculating a correction value through comparison of the intensity of said certain light to a reference value; and
    using the correction value to correct the intensity of said signal light.

* * * * *